(12) United States Patent
Rook

(10) Patent No.: US 9,849,971 B2
(45) Date of Patent: Dec. 26, 2017

(54) BRAKE AXLE SLEEVE

(71) Applicant: GOODRICH CORPORATION, Charlotte, NC (US)

(72) Inventor: Todd Rook, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 121 days.

(21) Appl. No.: 14/976,161

(22) Filed: Dec. 21, 2015

(65) Prior Publication Data

US 2017/0174327 A1    Jun. 22, 2017

(51) Int. Cl.
*B64C 25/36* (2006.01)
*B64C 25/42* (2006.01)
*F16D 65/00* (2006.01)
*B60B 35/08* (2006.01)

(52) U.S. Cl.
CPC ........... *B64C 25/36* (2013.01); *B64C 25/42* (2013.01); *F16D 65/0006* (2013.01)

(58) Field of Classification Search
CPC ..... B60B 335/02; B60B 335/08; B64C 25/36; B64C 25/42; B64C 25/58; F16C 3/02; B60K 17/22; F16F 15/02; F16F 15/12; F16F 15/14; F16F 15/145; F16F 15/322; F16F 7/10; F16D 65/0006

USPC .............. 301/124.1; 464/180, 183
See application file for complete search history.

(56) References Cited

U.S. PATENT DOCUMENTS

| | | | | |
|---|---|---|---|---|
| 476,108 | A * | 5/1892 | Webb | B60B 35/08 301/124.1 |
| 6,131,707 | A * | 10/2000 | Buechel | F16D 65/0006 188/18 A |
| 6,752,248 | B2 * | 6/2004 | Berwanger | F16D 65/0006 188/71.5 |
| 6,837,345 | B1 * | 1/2005 | Lauble | F16F 1/371 188/378 |
| 8,454,040 | B2 * | 6/2013 | Westnedge | B23P 11/00 280/124.116 |
| 8,616,344 | B2 * | 12/2013 | Baden | F16D 55/36 188/71.5 |
| 8,616,345 | B2 * | 12/2013 | Rook | F16D 55/36 188/71.4 |

* cited by examiner

*Primary Examiner* — Kip T Kotter
(74) *Attorney, Agent, or Firm* — Snell & Wilmer, L.L.P

(57) ABSTRACT

An aircraft brake system may include an axle and a brake axle sleeve. The brake axle sleeve may have a plurality of recesses asymmetrically disposed about an inner circumference of the brake axle sleeve. The plurality of recesses may attenuate vibrations in the aircraft brake system.

20 Claims, 3 Drawing Sheets

BRAKE AXLE SLEEVE

FIELD

The present disclosure relates generally to the field of vibration clamping, and more specifically, to systems and methods for axle vibration damping.

BACKGROUND

Conventional aircraft wheel and brake assemblies comprise rotating and stationary components. During braking, vibration, including harmonic vibration, of a wheel and brake assembly, including an axle assembly, may occur. In particular, systems with multiple axes of symmetry are susceptible to harmonic vibration. Brake vibration can result in damaged aircraft components if not properly managed.

SUMMARY

A brake axle assembly may comprise an axle and a brake axle sleeve disposed circumferentially around the axle, wherein the brake axle sleeve comprises a plurality of recesses asymmetrically disposed about an inner circumference of the brake axle sleeve.

In various embodiments, the brake axle sleeve may comprise a first circumferential region and a second circumferential region. An angular distance between recesses in the first circumferential region may be smaller than an angular distance between recesses in the second circumferential region. The plurality of recesses may decrease a stiffness of the brake axle sleeve asymmetrically. The plurality of recesses may be configured to decrease vibration in the brake axle assembly. The brake axle sleeve may comprise a first circumferential region, a second circumferential region, and a third circumferential region, wherein a stiffness of the third circumferential region is greater than a stiffness of the second circumferential region, and wherein the stiffness of the second circumferential region is greater than a stiffness of the first circumferential region. A coefficient of friction between the axle and the brake axle sleeve in the first circumferential region may be less than a coefficient of friction between the axle and the brake axle sleeve in the second circumferential region.

A brake axle sleeve may comprise a plurality of recesses in an inner circumference of the brake axle sleeve, wherein the plurality of recesses are asymmetrically disposed about the inner circumference.

In various embodiments, the plurality of recesses may comprise a first plurality of recesses in a first circumferential region of the brake axle sleeve, and a second plurality of recesses in a second circumferential region of the brake axle sleeve. A distance between recesses in the first plurality of recesses may be less than a distance between recesses in the second plurality of recesses. A stiffness of the brake axle sleeve in the first circumferential region may be less than a stiffness of the brake axle sleeve in the second circumferential region. The plurality of recesses may be configured to attenuate whirling of an axle. The brake axle sleeve may comprise a third circumferential region without any recesses. The brake axle sleeve may be an aircraft brake axle sleeve.

A brake system for an aircraft may comprise an axle located within a brake axle sleeve, wherein the brake axle sleeve comprises a first circumferential region and a second circumferential region, and wherein a stiffness of the first circumferential region is greater than a stiffness of the second circumferential region.

In various embodiments, the first circumferential region may comprise a first plurality of recesses. The second circumferential region may comprise a second plurality of recesses. A distance between recesses in the first plurality of recesses may be larger than a distance between recesses in the second plurality of recesses. A coefficient of friction in the first circumferential region may be greater than a coefficient of friction in the second circumferential region. The first plurality of recesses may be configured to attenuate vibrations.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of various embodiments herein makes reference to the accompanying drawings, which show various embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, methods may find particular use in connection with aircraft wheel and brake systems. However, various aspects of the disclosed embodiments may be adapted for optimized performance with a variety of components and in a variety of systems. As such, numerous applications of the present disclosure may be realized.

In various embodiments, a brake axle sleeve may comprise an asymmetric inner profile. As the rotation of the wheel introduces vibrations in the axle and causes the axle to whirl within the brake axle sleeve, the asymmetric inner profile may introduce asymmetric forces on the axle, which may prevent whirl and decrease vibrations in the axle. The brake axle sleeve may comprise a plurality of recesses asymmetrically disposed around the inner circumference of the brake axle sleeve. In regions with more or larger recesses, the brake axle sleeve may be less stiff and provide a relatively smaller reaction force on the axle.

Figure 1:
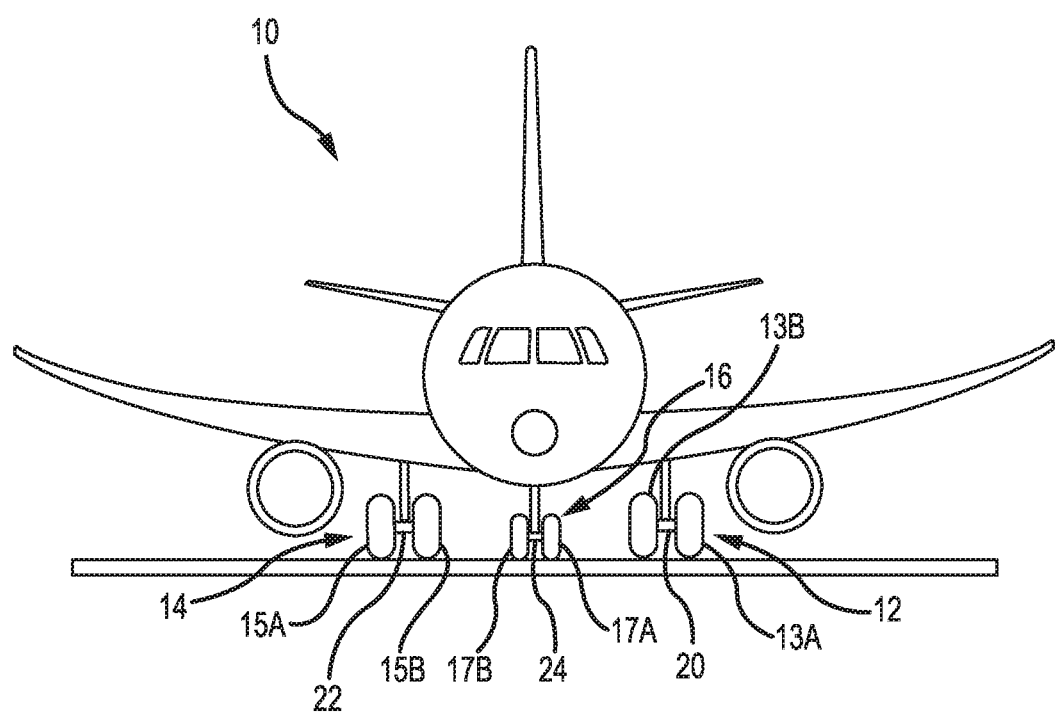
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer.

Figure 2A:
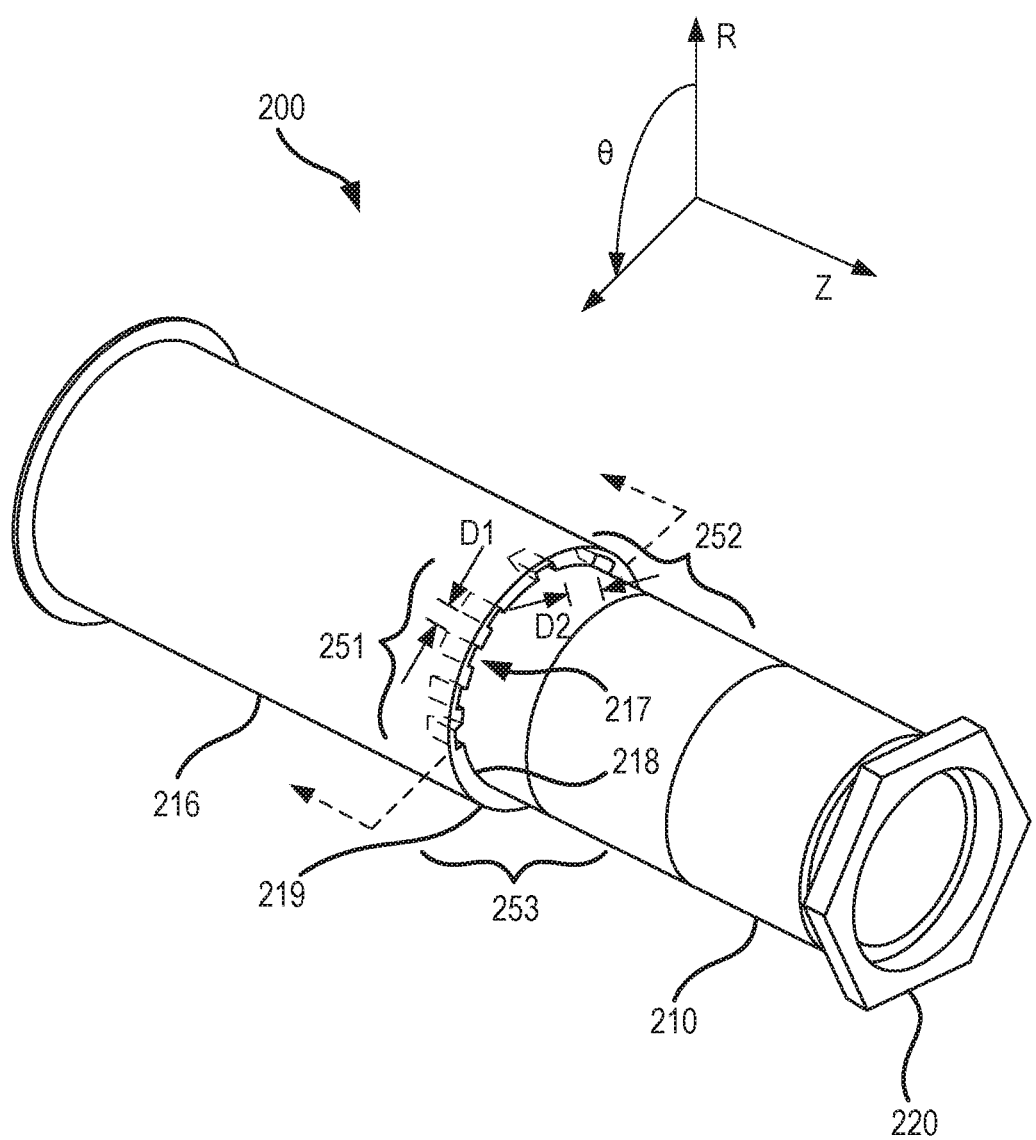
FIG. 2A illustrates a perspective view of a portion of an aircraft axle assembly, in accordance with various embodiments.
Figure 2B:
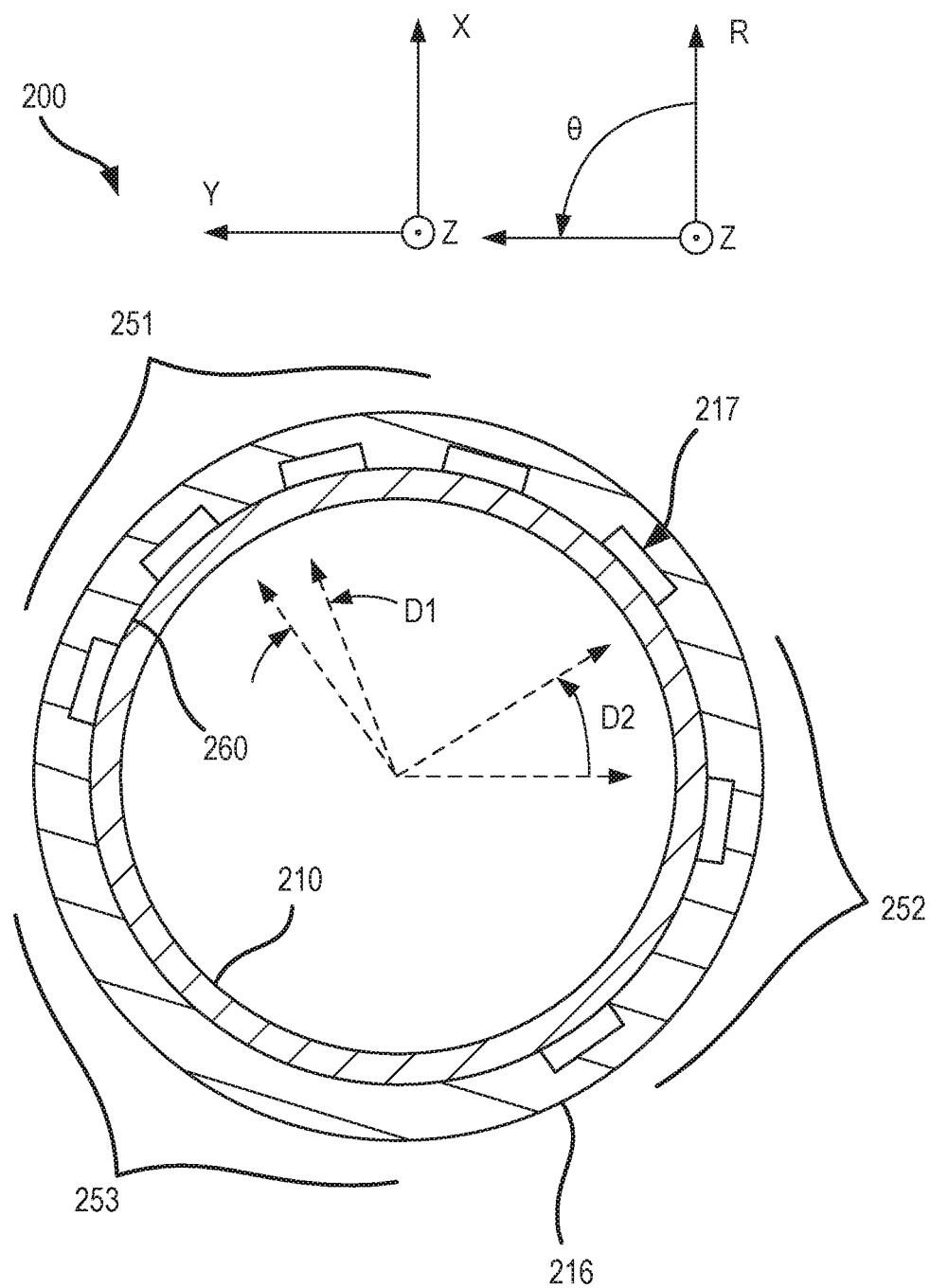
FIG. 2B illustrates a cross-section view of the aircraft axle assembly, in accordance with various embodiments.

Referring to FIGS. 2A and 2B, a perspective view and a cross-section view of a portion of an axle assembly 200 are illustrated according to various embodiments. R-z-θ axes are used to illustrate the axial (z), radial (r) and circumferential (θ) directions relative to the axle assembly 200. Additionally, x-y-z axis are used to illustrate the upward (x), forward (y), and axial (z) directions. In various embodiments, the axle assembly 200 may include an axle 210, a brake axle sleeve 216, and a nut (also referred to herein as axle nut) 220. In various embodiments, the axle 210 may be similar to axle 22 (see FIG. 1). In various embodiments, the axle assembly 200 may comprise a wheel axle sleeve separating the axle 210 and the brake axle sleeve 216.

The brake axle sleeve 216 may circumferentially surround at least a portion of the axle 210. The brake axle sleeve 216 may be a sacrificial component which is configured to protect the axle 210 from damage. The brake axle sleeve 216 may be configured to be coupled to a brake system. In various embodiments, the axle nut 220 may be coupled to the axle 210. The axle nut 220 may axially (z-direction) retain a wheel, such as wheel 15B (see FIG. 1) for example, coupled to the axle 210. A wheel, such as wheel 15B (see FIG. 1) may rotate about the axle 210.

In various embodiments, the brake axle sleeve 216 may be configured to react to movement of the axle 210. For example, the axle 210 may move radially in the x or y-direction and in response, the axle 210 may contact the brake axle sleeve 216, causing a reaction force and applying a force to the axle 210 in the opposite direction.

The brake axle sleeve 216 may comprise a plurality of recesses 217. The recesses 217 may be formed in the inner circumference 218 of the brake axle sleeve 216. The recesses 217 may extend in an axial (negative z-direction) from a distal edge 219 of the brake axle sleeve 216. The recesses 217 may be asymmetrically disposed about the inner circumference 218 of the brake axle sleeve 216. For example, in a first circumferential region 251, the recesses 217 may be separated by a first angular distance D1, in a second circumferential region 252, recesses 217 may be separated by a second angular distance D2, and in a third circumferential region 253, there may be no recesses 217 present. In various embodiments, the first circumferential region 251, the second circumferential region 252, and the third circumferential region 253 may each comprise 120 degrees of the full circumference of the brake axle sleeve 216. In various embodiments, there may be at least twice as many recesses 217 in the first circumferential region 251 than in the second circumferential region 252. In various embodiments, the recess density (defined herein as the number of recesses 217 per radian) may be at least twice as great in the first circumferential region 251 than the second circumferential region 252. The recesses 217 may be separated by splines 260. In the first circumferential region 251, the splines 260 may comprise an equal angular size as the recesses 217. In the second circumferential region 252, the splines 260 may comprise a greater angular size than the recesses 217. In various embodiments, the size of the recesses 217 may vary in the different circumferential regions 251, 252, 253.

The stiffness of the brake axle sleeve 216 may be different in the different circumferential regions 251, 252, 253 due to the decrease in material from the recesses 217. For example, the second circumferential region 252 has more recesses 217 (and thus less material in the brake axle sleeve 216) than the third circumferential region 253, so the stiffness of the brake axle sleeve 216 may be greater in the third circumferential region 253 than the second circumferential region 252. Similarly, the first circumferential region 251 has more recesses 217 than the second circumferential region 252, so the stiffness of the brake axle sleeve 216 may be greater in the second circumferential region 252 than the first circumferential region 251. In the event that the axle 210 begins to whirl, or precess about its center, the different stiffnesses of the circumferential regions 251, 252, 253 may cause the brake axle sleeve 216 to apply asymmetric reaction forces on the axle 210, which may attenuate the whirling of the axle 210. Additionally, the different amounts or sizes of the recesses 217 in the circumferential regions 251, 252, 253 may create different contact surface areas and coefficients of friction between the brake axle sleeve 216 and the axle 210, which may create asymmetric frictional forces between the brake axle sleeve 216 and the axle 210. The asymmetric frictional forces may also attenuate vibration in the axle assembly 200.

By introducing asymmetry into the axle assembly 200, the recesses 217 in the brake axle sleeve 216 may reduce or mitigate harmonic vibration of the axle 210. Although shown as having three circumferential regions 251, 252, 253, those skilled in the art will recognize that any number of circumferential regions may be utilized to introduce asymmetry into the interaction between the brake axle sleeve 216 and the axle 210. Similarly, any suitable number, shape, or size of recesses 217 may be used to introduce asymmetry into the interaction between the brake axle sleeve 216 and the axle 210.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment. C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion such that a process, method, article, or apparatus that comprises a list of elements does not include only those elements but may include other elements not expressly listed or inherent to such process, method, article, or apparatus.

The invention claimed is:

1. A brake axle assembly comprising:
   an axle; and
   a sacrificial brake axle sleeve disposed circumferentially around the axle, wherein the sacrificial brake axle sleeve comprises a plurality of recesses separated by splines and asymmetrically disposed about an inner circumference of the sacrificial brake axle sleeve, wherein the axle is in contact with the splines, wherein the plurality of recesses decrease a contact surface area between the sacrificial brake axle sleeve and the axle.

2. The brake axle assembly of claim 1, wherein the sacrificial brake axle sleeve comprises a first circumferential region and a second circumferential region.

3. The brake axle assembly of claim 2, wherein an angular distance between recesses in the first circumferential region is smaller than an angular distance between recesses in the second circumferential region.

4. The brake axle assembly of claim 1, wherein the plurality of recesses decrease a stiffness of the sacrificial brake axle sleeve asymmetrically.

5. The brake axle assembly of claim 1, wherein the plurality of recesses are configured to decrease vibration in the brake axle assembly.

6. The brake axle assembly of claim 1, wherein the sacrificial brake axle sleeve comprises a first circumferential region, a second circumferential region, and a third circumferential region, wherein a stiffness of the third circumferential region is greater than a stiffness of the second circumferential region, and wherein the stiffness of the second circumferential region is greater than a stiffness of the first circumferential region.

7. The brake axle assembly of claim 6, wherein a coefficient of friction between the axle and the sacrificial brake axle sleeve in the first circumferential region is less than a coefficient of friction between the axle and the brake axle sleeve in the second circumferential region.

8. A sacrificial brake axle sleeve comprising a plurality of recesses in an inner circumference of the sacrificial brake axle sleeve, wherein the plurality of recesses are asymmetrically disposed about the inner circumference, wherein the plurality of recesses are separated by splines, wherein the splines are configured to contact an axle, wherein the plurality of recesses are configured to decrease a contact surface area between the sacrificial brake axle sleeve and the axle.

9. The sacrificial brake axle sleeve of claim 8, wherein the plurality of recesses comprises a first plurality of recesses in a first circumferential region of the sacrificial brake axle sleeve, and a second plurality of recesses in a second circumferential region of the sacrificial brake axle sleeve.

10. The sacrificial brake axle sleeve of claim 9, wherein a distance between recesses in the first plurality of recesses is less than a distance between recesses in the second plurality of recesses.

11. The sacrificial brake axle sleeve of claim 9, wherein a stiffness of the sacrificial brake axle sleeve in the first circumferential region is less than a stiffness of the sacrificial brake axle sleeve in the second circumferential region.

12. The sacrificial brake axle sleeve of claim 9, further comprising a third circumferential region without any recesses.

13. The sacrificial brake axle sleeve of claim 8, wherein the plurality of recesses are configured to attenuate whirling of an axle.

14. The sacrificial brake axle sleeve of claim 8, wherein the sacrificial brake axle sleeve is an aircraft brake axle sleeve.

15. A brake system for an aircraft comprising:
   an axle located within a sacrificial brake axle sleeve, wherein the sacrificial brake axle sleeve comprises a first circumferential region and a second circumferential region, and wherein a stiffness of the first circumferential region is greater than a stiffness of the second circumferential region, wherein the first circumferential region comprises a first plurality of splines, wherein the second circumferential comprises a second plurality of splines, wherein the axle is in contact with the first plurality of splines and the second plurality of splines, wherein a contact surface area between the axle and the sacrificial brake axle sleeve is greater in the first circumferential region than the second circumferential region.

16. The brake system of claim 15, wherein the first circumferential region comprises a first plurality of recesses.

17. The brake system of claim 16, wherein the second circumferential region comprises a second plurality of recesses.

18. The brake system of claim 17, wherein a distance between recesses in the first plurality of recesses is larger than a distance between recesses in the second plurality of recesses.

19. The brake system of claim 16, wherein the first plurality of recesses are configured to attenuate vibrations.

20. The brake system of claim 15, wherein a coefficient of friction in the first circumferential region is greater than a coefficient of friction in the second circumferential region.

* * * * *